US006188736B1

(12) United States Patent
Lo et al.

(10) Patent No.: US 6,188,736 B1
(45) Date of Patent: Feb. 13, 2001

(54) NEAR-OPTIMAL LOW-COMPLEXITY DECODING OF SPACE-TIME CODES FOR FIXED WIRELESS APPLICATIONS

(75) Inventors: Titus Lo, Redmond, WA (US); Vahid Tarokh, Madison, NJ (US)

(73) Assignee: AT&T Wireless Svcs. Inc., Redmond, WA (US)

( * ) Notice: Under 35 U.S.C. 154(b), the term of this patent shall be extended for 0 days.

(21) Appl. No.: 09/063,765

(22) Filed: Apr. 21, 1998

Related U.S. Application Data

(60) Provisional application No. 60/068,613, filed on Dec. 23, 1997.

(51) Int. Cl.$^7$ ........................................................ H04B 7/04
(52) U.S. Cl. ..................... 375/347; 375/130; 375/346; 375/267; 455/303; 455/304; 702/191
(58) Field of Search ..................................... 375/346, 347

(56) References Cited

U.S. PATENT DOCUMENTS

| | | | | |
|---|---|---|---|---|
| 5,202,903 | * | 4/1993 | Okanoue | 375/347 |
| 5,481,572 | * | 1/1996 | Skold et al. | 375/347 |
| 5,553,102 | * | 9/1996 | Jasper et al. | 375/347 |
| 5,943,372 | * | 8/1999 | Gans et al. | 375/347 |
| 5,949,833 | * | 9/1999 | Weerackody | 375/347 |
| 5,960,039 | * | 9/1999 | Martin et al. | 379/267 |
| 5,991,331 | * | 11/1999 | Chennakeshu et al. | 375/202 |
| 6,034,987 | * | 3/2000 | Chennakeshu et al. | 375/202 |

FOREIGN PATENT DOCUMENTS

| | | |
|---|---|---|
| 2311445 | 9/1997 | (GB) . |
| WO 91/20142 | 12/1991 | (WO) . |

OTHER PUBLICATIONS

"Space–time Codes for High Data Rate Wireless Communication: Performance Criterion and Code Construction" Tarokh, V.; Seshadri, N.; Calderbank, A.R. Info. Theory, IEEE Trans. on, vol. 44 No. 2, Mar. 1998, pp.: 744–765.*

"Diversity for the direct–sequence spread spectrum system using multiple transmit antennas" Weerackody, V., Communications 1993, IEEE Intntl. Conf. on, ICC '93 Geneva, Tech. Program Conf. Record, vol. 3, 1993, pp.:1775–1779 vol. 3.*

"The diversity gain of transmit diversity in wireless systems with Rayleigh fading" Winters, J.H., Communications, IEEE Int. Conf. on, 1994. ICC '94, SUPERCOMM/ICC '94, Conference Record, 'Serving Humanity Through Communications.' pp.: 1121–1125 vol. 2.*

"A new bandwidth effect transmit antenna modulation diversity scheme for linear digital modulation" Wittneben, A. Communications, IEEE International Conf. on, 1993. ICC '93 Geneva. Technical Program, Conference Record, vol. 3, pp. 1630–1634 vol. 3.*

"The Impact of Antenna Diversity on the Capacity of Wireless Communication Systems" Winters, J.H.; Salz, J.; Gitlin, R.D. Communications, IEEE Transactions on, vol.: 42 No. 2, Feb./Mar./Apr. 1994, pp. 1740–1751.*

* cited by examiner

Primary Examiner—Stephen Chin
Assistant Examiner—Paul N. Rupert

(57) ABSTRACT

An improved multi-antenna receiver is realized for detecting signals transmitted by a multi-antenna transmitter by summing signals received at the plurality of receiver antennas after multiplying each by a respective constant. The summed signal is applied to a maximum likelihood detector. The respective constants, $\lambda_j$, where j is an index designating a particular receiver antenna, are determined by evaluating the largest eigenvector of the matrix A, where $\Lambda$ is a vector containing the values $\lambda_j$, and A is a matrix containing elements $\alpha_{ij}$, which is the transfer function between the $i^{th}$ transmitter antenna to the $j^{th}$ receiver antenna. The $\alpha_{ij}$ terms are determined in the receiver in conventional ways.

4 Claims, 2 Drawing Sheets

NEAR-OPTIMAL LOW-COMPLEXITY DECODING OF SPACE-TIME CODES FOR FIXED WIRELESS APPLICATIONS

This application claims the benefit of U.S. Provisional application Ser. No. 60/068613, filed Dec. 23, 1997.

BACKGROUND OF THE INVENTION

This invention relates to wireless systems and, more particularly, to systems having more than one antenna at the receiver and at the transmitter.

Physical constraints as well as narrow bandwidth, co-channel interference, adjacent channel interference, propagation loss and multi-path fading limit the capacity of cellular systems. These are severe impairments, which liken the wireless channel to a narrow pipe that impedes the flow of data. Nevertheless, interest in providing high speed wireless data services is rapidly increasing. Current cellular standards such as IS-136 can only provide data rates up to 9.6 kbps, using 30 kHz narrowband channels. In order to provide wideband services, such as multimedia, video conferencing, simultaneous voice and data, etc., it is desirable to have data rates in the range of 64–144 kbps.

Transmission schemes for multiple antenna systems may be part of a solution to the problem of the currently available low data rates. Such schemes were first proposed in papers by Wittneben, and by Seshadri and Winters, where the problem was addressed in the context of signal processing.

One prior art arrangement having a single transmitter antenna and multiple receiver antennas is shown in FIG. 1. Each of the receiver antennas receives the transmitted signal via a slightly different channel, where each channel i is characterized by transfer function $\alpha_i$. Using an approach known as "Maximum Ratio Combining", the prior art approach to detection contemplates multiplying each received signal that had been influenced by $\alpha_i^j$ by the complex conjugate signal, $a_i^*$, summed, and then processed.

In a co-pending application titled "Method and Apparatus for Data Transmission Using Space-Time Codes and Multiple Transmit Antennas", filed on May 6, 1997, bearing the Ser. No. 08/847,635, and assigned to the assignee of this invention, a coding perspective was adopted to propose space-time coding using multiple transmit and receive antennas. Space-time coding integrates channel coding, modulation, and multiple transmit antennas to achieve higher data rates, while simultaneously providing diversity that combats fading. It may be demonstrated that adding channel coding provides significant gains over the schemes of Wittneben and Seshadri and Winters. In said co-pending application, space-time codes were designed for transmission using 2–4 transmit antennas. These codes perform extremely well in slowly varying fading environments (such as indoor transmission media). The codes have user bandwidth efficiencies of up to 4 bits/sec/Hz which are about 3–4 times the efficiency of current systems. Indeed, it can be shown that the designed codes are optimal in terms of the trade-off between diversity advantage, transmission rate, decoding complexity and constellation size.

It can also be shown that as the number of antennas is increased, the gain increases in a manner that is not unlike a multi-element antenna that is tuned to, say, a particular direction. Unfortunately, however, when maximum likelihood detection is employed at the receiver, the decoding complexity increases when the number of transmit and receive antennas is increased. It would be obviously advantageous to allow a slightly sub-optimal detection approach that substantially reduces the receiver's computation burden.

SUMMARY

Such an approach is achieved with a receiver arrangement where signals received at a plurality of antennas are each multiplied by a respective constant and then summed prior to being applied to a maximum likelihood detector. The respective constants, $\lambda_j$, where j is an index designating a particular receiver antenna, are derived from a processor that determines the largest eigenvector of the matrix A, where $\Lambda$ is a vector containing the values $\lambda_j$, and A is a matrix containing elements $\alpha_{ij}$, which is the transfer function between the $i^{th}$ transmitter antenna to the $j^{th}$ receiver antenna. The $\alpha_{ij}$ terms are determined in the receiver in conventional ways.

DETAILED DESCRIPTION

Figure 1:
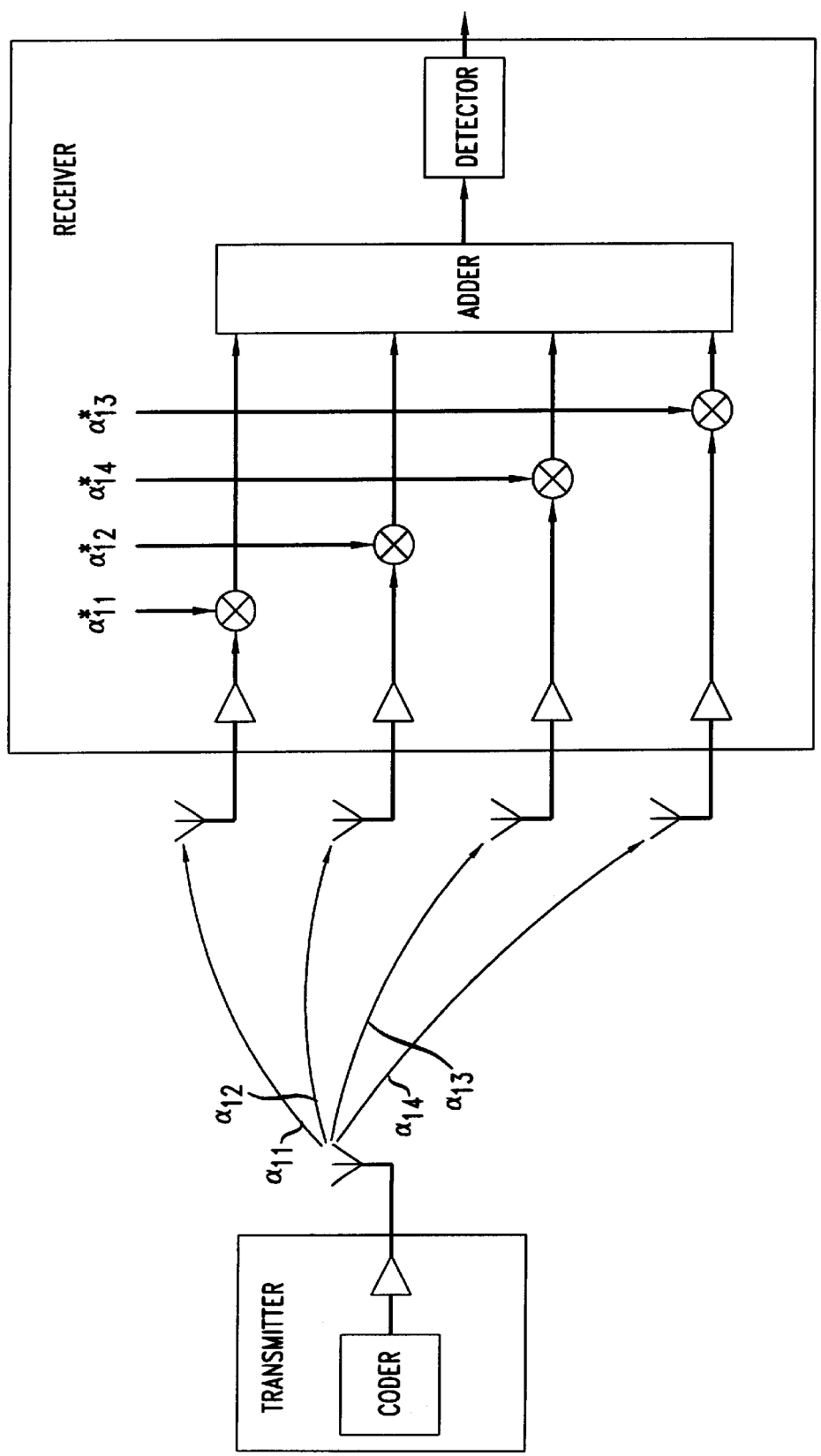
FIG. 1 presents a block diagram of Maximal Ratio Combining detection.
Figure 2:
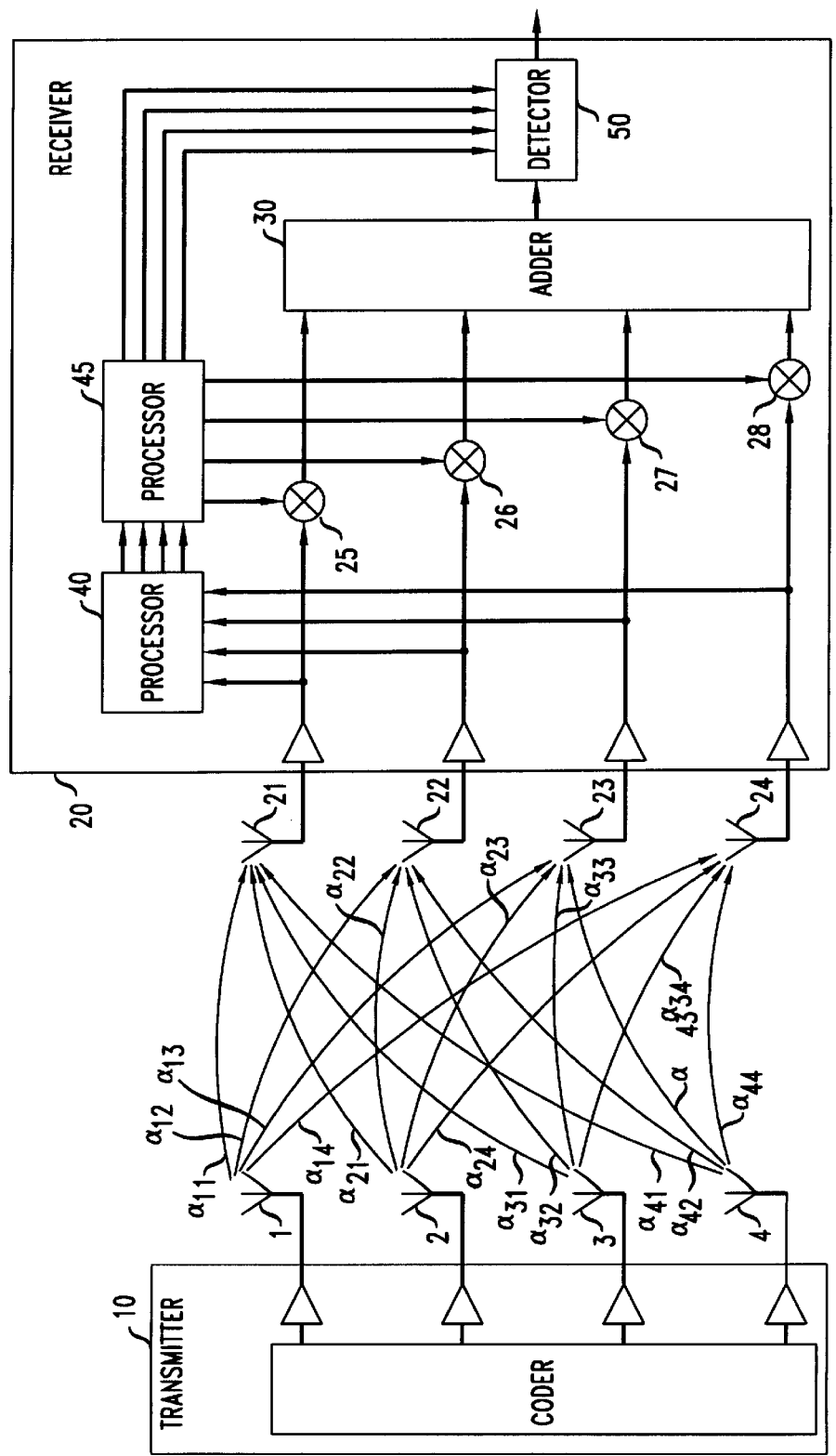
FIG. 2 presents a block diagram of an arrangement including a transmitter having a plurality of antennas, and a receiver having a plurality of antennas coupled to an efficient detection structure.

FIG. 2 presents a block diagram of a receiver in accord with the principles of this invention. It includes a transmitter 10 that has an n plurality of transmitting antenna 1, 2, 3, 4, and a receiver 20 that has an m plurality of receiver antennas 21, 22, 23, 24. The signals received by the receiver's antennas are multiplied in elements 25, 26, 27, and 28, and summed in adder 30. More specifically, the received signal of antenna j is multiplied by a value, $\lambda_j$, and summed. The collection of factors $\lambda_j$ can be viewed as a vector $\Lambda$. The outputs of the receiver antennas are also applied to processor 40 which, employing conventional techniques, determines the transfer functions $\alpha_{ij}$ for i=1, 2, 3, . . . , n and j=1, 2, 3, . . . , m. These transfer functions can be evaluated, for example, through the use of training sequences that are sent by the different transmitter antennas, one antenna at a time.

The evaluated $\alpha_{ij}$ signals of processor 40 are applied to processor 45 in FIG. 2 where the multiplier signals $\lambda_j$, j=1, 2, 3, . . . , m are computed. Processor 45 also evaluates a set of combined transfer function values $\gamma_i$, i=1, 2, 3, . . . , n (which are described in more detail below). Signals $\gamma_i$ of processor 45 and the output signal of adder 30 are applied to detector 50 which detects the transmitted symbols in accordance with calculations disclosed below.

It is assumed that the symbols transmitted by the antennas of transmitter 10 have been encoded in blocks of L time frames, and that fading is constant within a frame. A codeword comprises all of the symbols transmitted within a frame, and it corresponds, therefore, to $$c_1^1 c_1^2 c_1^3 \ldots c_1^4 c_2^1 c_2^2 c_2^3 \ldots c_2^4 c_3^1 c_3^2 c_3^3 \ldots c_3^4 \ldots c_m^1 c_m^2 c_m^3 \ldots c_m^4, \quad (1)$$

where the superscript designates the transmitter's antennas and the subscript designates the time of transmission (or position within a frame).

From the standpoint of a single transmitting antenna, e.g., antenna 1, the signal that is received from antenna 1 in response to a transmitted symbol $c_t^1$ at time interval t is:

$$R_t = c_t^1(\alpha_{11}\lambda_1 + \alpha_{12}\lambda_2 + \alpha_{13}\lambda_3 + \ldots + \alpha_{1m}\lambda_m) \quad (2)$$

-continued $$= c_t^1 \sum_{j=1}^m \lambda_j \alpha_{1j}$$

$$= c_t^1 \gamma_1 \qquad (2)$$

(when noise is ignored). If each $\lambda_j$ value is set to $\alpha^*_{1j}$, (where $\alpha^*_{1j}$ is the complex conjugate of $\alpha_{1j}$) then the received signal would simply be $$R_t = c_t^1 \sum_{i=1}^m |\alpha_{1j}|^2 \qquad (3)$$

yielding a constructive addition.

Of course, the values of $\lambda_j$ cannot be set to match $\alpha^*_{1j}$ and concurrently to match the values of $\alpha^*_{ij}$ where i≠1; and therein lies the difficulty.

When all n of the transmitting antennas are considered, then the received signal is $$R_t = \sum_{i=1}^n \left( c_t^i \sum_{j=1}^m \lambda_j \alpha_{ij} \right) \qquad (4)$$

$$= \sum_{i=1}^n c_t^i \gamma_i$$

In accordance with the present disclosure, the objective is to maximize $$\sum_{i=1}^n |\gamma_i|^2$$

because by doing so, signal $R_t$ contains as much information about $c_t^i$, i=1, 2, 3, . . . n as is possible. However, it can be easily shown that if a matrix A is constructed such that $$A = \sum_{i=1}^n (\Omega_i^*)^T \Omega_i, \qquad (5)$$

where $\Omega_i = (\alpha_{i1}, \alpha_{i2}, \alpha_{i3} \ldots \alpha_{im})$, then $$\sum_{i=1}^n |\gamma_i|^2 = \Lambda A(\Lambda^*)^T. \qquad (6)$$

The receiver, thus, has to maximize $\Lambda A(\Lambda^*)^T$, subject to the constraint $\|\Lambda\|^2=1$. The solution to this problem is to choose $\Lambda$ to be the eigenvector of A which corresponds to the maximum eigenvalue of A. Accordingly, processor 45 develops the matrix A from the values of $\alpha_{ij}$, finds the eigenvalues of A in a conventional manner, selects the maximum eigenvalue of A, and creates the vector $\Lambda$. Once $\Lambda$ is known, processor 45 develops signals $\gamma_i$ for $1=1, 2, 3, \ldots, n$, $$\left( \text{where } \gamma_i = \sum_{j=1}^m \lambda_j \alpha_{ij} \right),$$

and applies them to detector 50. Finally, detector 50 minimizes the metric $$\sum_{t=1}^L \left| R_t - \sum_{i=1}^n \gamma_i c_t^i \right|^2$$

from amongst all possible codewords in a conventional manner. As can be seen, this approach reduces the complexity of decoding by almost a factor of m.

FIG. 2 depicts separate multipliers to multiply received signals by multiplication factors $\lambda_i$, and it depicts separate blocks for elements 30, 40, 45, and 50. It should be understood, however, that different embodiments are also possible. For example, it is quite conventional to incorporate all of the above-mentioned elements in a single special purpose processor, or in a single stored program controlled processor (or a small number of processors). Other modifications and improvements may also be incorporated, without departing from the spirit and scope of the invention, which is defined in the following claims.

We claim:

1. A receiver comprising:

an n plurality of antennas, where n is greater than one;

circuitry for obtaining n signals transmitted from m antennas of a transmitter, where m is greater than one; and processing means for developing a sum signal that corresponds to the addition of said n signals that are each pre-multiplied by a respective factor $\lambda_j$, where j is an index integer specifying that factor $\lambda_j$ multiplies the signal received from antenna j of said n plurality of antennas, developing values for transfer functions $\alpha_{ij}$, where i is an index that references said transmitting antennas, and j is an index that references said receiving antennas, developing said factors $\lambda_j$ from said transfer functions, where said factors are components of a vector $\Lambda$ where $\Lambda$ is an eigenvector of A, and where A is a matrix containing said elements $\alpha_{ij}$, and detecting symbols transmitted by said m transmitter antennas embedded in said sum signal.

2. The receiver of claim 1 where said detecting compares said sum signal to a signal corresponding to symbols $c^i$ possibly transmitted by transmitting antenna i of said m transmitting antennas multiplied by corresponding factors $\gamma_i$.

3. The receiver of claim 2 where said corresponding factor $\gamma_i$ is related to said factors $\lambda_j$, for j=1, 2, 3, . . . , m, and to $\alpha_{ij}$.

4. The receiver of claim 2 where said detecting minimizes the metric $$\sum_{t=1}^L \left| R_t - \sum_{i=1}^n \gamma_i c_t^i \right|^2,$$

where $R_t$ is said sum signal at time interval t within a frame having L time intervals, and $c_t^i$ is the symbol that might have been transmitted over transmitting antenna i at time interval t.

* * * * *